(12) United States Patent
Moreau

(10) Patent No.: US 12,532,931 B2
(45) Date of Patent: Jan. 27, 2026

(54) METHOD AND SYSTEM FOR AUTOMATICALLY DETECTING CHARACTERISTIC POINTS OF A HERRINGBONE FABRIC WITH A VIEW TO AUTOMATICALLY CUTTING PIECES

(71) Applicant: LECTRA, Paris (FR)

(72) Inventor: Patrick Moreau, Pessac (FR)

(73) Assignee: LECTRA, Paris (FR)

( * ) Notice: Subject to any disclaimer, the term of this patent is extended or adjusted under 35 U.S.C. 154(b) by 489 days.

(21) Appl. No.: 17/918,610

(22) PCT Filed: Apr. 9, 2021

(86) PCT No.: PCT/FR2021/050631
§ 371 (c)(1),
(2) Date: Oct. 13, 2022

(87) PCT Pub. No.: WO2021/209703
PCT Pub. Date: Oct. 21, 2021

(65) Prior Publication Data
US 2023/0143017 A1    May 11, 2023

(30) Foreign Application Priority Data

Apr. 16, 2020 (FR) ...................... 2003839

(51) Int. Cl.
*A41H 3/00* (2006.01)
*B26D 5/00* (2006.01)
(Continued)

(52) U.S. Cl.
CPC .............. *A41H 3/007* (2013.01); *B26D 5/00* (2013.01); *G06V 10/245* (2022.01); *G06V 10/42* (2022.01);
(Continued)

(58) Field of Classification Search
CPC .... A41H 3/007; B26D 5/00; B26D 2005/002; G06V 10/245; G06V 10/42; G06V 10/443;
(Continued)

(56) References Cited

U.S. PATENT DOCUMENTS 5,508,936 A * 4/1996 King .................... B26F 1/38
382/296
5,975,743 A * 11/1999 Bercaits ................ B26D 5/007
700/134

(Continued)

FOREIGN PATENT DOCUMENTS

DE    DD-298160 A5 * 2/1992
EP    0649068 A2    4/1995
(Continued)

OTHER PUBLICATIONS

International Search Report from PCT Application No. PCT/FR2021/050631, Jun. 8, 2021.
(Continued)

*Primary Examiner* — Vincent Rudolph
*Assistant Examiner* — Keely Gwynne Yeargin
(74) *Attorney, Agent, or Firm* — Workman Nydegger

(57) ABSTRACT

A method and system are provided for automatically detecting characteristic points of a herringbone fabric with a view to automatically cutting pieces. The herringbone patterns are formed by V-shaped features with vertices that are aligned along a plurality of parallel axes. The method proceeds with a step of acquiring an image of a segment of the fabric, a detection initialization step including, on the basis of predefined parameters or on the basis of the image, acquiring geometric parameters of the herringbone patterns and defining lines of operation perpendicular to the axes of the herringbone patterns, and a step of determining, in the
(Continued)

image, coordinates of points of passage of axes of the herringbone patterns along lines of operation via the optimization of a criterion of symmetry of two mirror sub-images acquired along lines of operation.

7 Claims, 5 Drawing Sheets

(51) Int. Cl.
  *G06V 10/24* (2022.01)
  *G06V 10/42* (2022.01)
  *G06V 10/44* (2022.01)
(52) U.S. Cl.
  CPC ...... *G06V 10/443* (2022.01); *B26D 2005/002* (2013.01)
(58) Field of Classification Search
  CPC ........... G05B 2219/37555; G05B 2219/45044; G05B 2219/45196; G05B 19/408
  See application file for complete search history.

(56) References Cited

U.S. PATENT DOCUMENTS

| | | | |
|---|---|---|---|
| 7,499,830 B2* | 3/2009 | Harding | G01B 11/255 |
| | | | 702/167 |
| 8,717,581 B2* | 5/2014 | Laengle | G06T 7/74 |
| | | | 356/620 |
| 2005/0018878 A1 | 1/2005 | Paquette et al. | |
| 2012/0182415 A1* | 7/2012 | Toyoda | G06T 7/001 |
| | | | 348/80 |

FOREIGN PATENT DOCUMENTS

| | | | | |
|---|---|---|---|---|
| EP | 0759708 A1 | 3/1997 | | |
| JP | 2011200550 A | * 10/2011 | | |
| WO | WO-2019207496 A1 | * 10/2019 | ......... | D06B 11/0096 |

OTHER PUBLICATIONS

Search Report from corresponding French Application No. FR 2003839, Dec. 10, 2020.

* cited by examiner

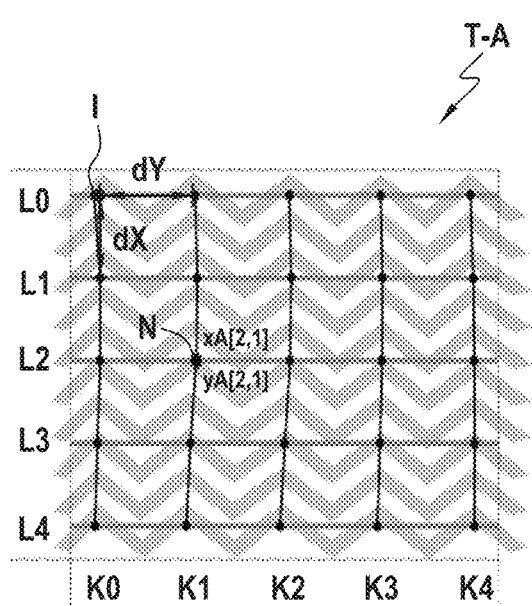
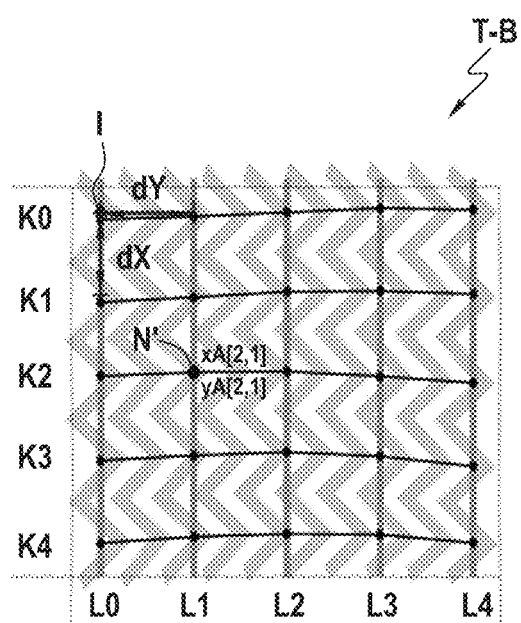
FIG. 4A　　　　FIG. 4B

METHOD AND SYSTEM FOR AUTOMATICALLY DETECTING CHARACTERISTIC POINTS OF A HERRINGBONE FABRIC WITH A VIEW TO AUTOMATICALLY CUTTING PIECES

TECHNICAL FIELD

The invention relates to the general field of the automatic cutting of pieces in a herringbone fabric. It relates more particularly to a method and system allowing to automatically detect certain characteristic points of the herringbone patterns of a fabric.

Fields of application of the invention are in particular the clothing and furniture industries.

PRIOR ART

When the production of clothing articles or furnishing elements involves an assembly of pieces cut from a fabric, there are particular constraints if the fabric is patterned. "Patterned fabric" means here any flexible textile material in sheet form printed with a pattern which is repeated with regular and predetermined pitches.

In this case, it is then desirable, even necessary, to respect the continuity of the pattern between two assembled pieces, for example two parts of a garment sewn to each other, or two pieces intended to be adjacent, for example two garment parts located side by side when the garment is worn, or two cushions of a sofa placed side by side.

In order to comply with these constraints, it is known to associate absolute or relative position markers with the pieces and to establish a hierarchy between main pieces and secondary pieces.

An absolute position marker is normally associated with a main piece. It characterizes the absolute positioning of the main piece in relation to the pattern of the fabric. The position of a piece relative to the pattern is characterized by the fact that a given point on the surface of the piece occupies a determined relative position with respect to the patterns which surround it. Thus, pieces whose locations on the surface of the fabric are deduced from each other by translations of an integer number of pattern pitches occupy the same position with respect to the pattern.

Relative position markers are associated with two pieces to be assembled taking into account requirements related to the existence of the pattern. They identify the locations of two connection points that must be matched when assembling the pieces.

For example, in the case of a jacket, a back piece can constitute a main piece. An absolute position marker is optionally associated with the back piece, for example when it is desired that a complete pattern be visible at a particular location of this piece. A sleeve, the neckline, a front then constitutes secondary pieces. For each of the latter, the location of a connection point is determined to match the location of the associated connection point on the main piece.

In addition, a piece with which a relative position marker is associated can also be the main piece of one or more other pieces. In this case, this is called a chain of links. Similarly, a piece can have an absolute, relative or no position mark in the weft thread axis, and another type of position mark (relative, absolute or none) for the fabric warp thread axis.

Moreover, it is known to carry out the cutting of fabric automatically. Automatic cutting installations have been marketed by the applicant for many years.

Typically, an automatic cutting method comprises a positioning operation which consists in determining in an optimal manner the positions of the pieces to be cut in a strip of fabric. The placement is selected in such a way as to minimize the loss of fabric while complying with certain constraints: respect for the straight grain, sufficient minimum margin between pieces, etc. . . . . In the case of a patterned fabric, there are additional constraints related to the compliance with the locations of the absolute position and relative position markers. Systems allowing an operator to define placements using computer workstations and specialized software are known, including in the case of patterned fabrics.

In order to perform the cut, the fabric is spread on a cutting table in one or more overlapping layers which can be held by suction through the table. The cut is performed by means of a tool carried by a head, the movements of which, relative to the cutting table, are controlled according to the predetermined placement. Cutting can be done by vibrating blade, rotating blade, laser, water jet, etc.

Difficulties arise when the fabric used is a patterned fabric. In particular, the problem of the non-coincidence between the model of fabric used for placement and the fabric actually spread on the cutting table arises in practice. This non-coincidence is reflected in particular in the following way. If the location on the cutting table at the coordinates of a reference point of a piece of placement is considered, it is found that the corresponding point on the spread fabric does not always occupy the desired relative position with respect to the pattern of the real fabric. These differences are more or less large and in practice unavoidable. They are due to printing defects, defects in laying the fabric on the cutting table, variations in the density of the threads of the loom and/or deformations of the fabric which can result in irregularities in the pitch of repetition and in the geometry of the pattern. As a result, the pre-established placement, or theoretical placement, must be modified to correspond to the reality of the spread fabric.

A method for performing this placement modification automatically is described in document EP 0,759,708 filed in the name of the applicant. After spreading the patterned fabric on the cutting table, this method provides for detecting any discrepancy between the real pitch of the pattern on the fabric and the theoretical pitch of the latter by capturing images of parts of the spread fabric then verifying on the captured images that locations corresponding to stored information occupy desired positions relative to the actual pattern of the spread fabric. If necessary, the theoretical placement of the pieces is modified according to the result of the control in order to adapt it to the real pitch of the pattern on the spread fabric taking into account the real characteristics of the fabric.

The automatic cutting method is therefore based on the definition of absolute or relative position markers for the pieces to be cut, and on the detection of the patterns on the fabric spread on the cutting table in order to adjust the positioning and the geometry if necessary, of the pieces to be cut.

The methods known from the prior art for automatically modifying the placement and the geometry of the pieces to be cut adapt perfectly to striped fabrics which can be similar to herringbone fabrics.

Herringbone fabrics have weaves obtained by reproducing, after inversion, weaves in twill or twill derivatives which give a zigzag or sawtooth effect. These staggered herringbone patterns are achieved with different colored warp and weft yarns and a staggered twill weave.

On such herringbone pattern fabrics, the algorithms currently on the market do not allow to automatically recognize the different characteristic points of the herringbone patterns in order to digitally construct a plurality of lines passing through the vertices of the herringbone patterns. Also, to cut such fabrics complying with the constraints of placement, the operator of the cutting machine must manually indicate on the image the position of different characteristic points of the herringbone patterns. However, this manual registration operation is long, tiring for the operator and has a strong impact on the productivity of the cutting operation.

DESCRIPTION OF THE INVENTION

The purpose of the present invention is therefore to propose a method for detecting characteristic points of a herringbone fabric with a view to automatically cutting pieces which does not have the aforementioned disadvantages.

According to the invention, this purpose is achieved by means of a method for automatically detecting characteristic points of a herringbone fabric with a view to automatically cutting pieces, the herringbone patterns being formed by V-shaped features with vertices that are aligned along a plurality of parallel axes, the method comprising:
  a step of acquiring an image of a segment of the fabric;
  a detection initialization step comprising, on the basis of predefined parameters or on the basis of the image, acquiring geometric parameters of the herringbone patterns and defining lines of operation perpendicular to the axes of the herringbone patterns; and
  a step of determining, in the image, coordinates of points of passage of axes of the herringbone patterns along lines of operation via the optimization of a criterion of symmetry of two mirror sub-images acquired along lines of operation.

The method according to the invention is remarkable in that it allows, automatically, to detect the position of the lines passing through the vertex of the herringbone patterns via the optimization of a criterion of symmetry of two mirror sub-images acquired along predefined lines of operations. The result of this automatic detection is a considerable time saving on the cutting process. The productivity of the cutting operation is greatly increased.

Preferably, the detection initialization step comprises the determination by an operator of an initial point of coordinates corresponding to the first theoretical point of passage on the first line of operation, the determination by the operator or on the basis of predefined parameters of the theoretical spacing between two herringbone pattern axes, the definition on the basis of the initial point of the lines of operation perpendicular to the axes of the herringbone patterns, the lines of operation being spaced from each other by a pitch defined by the operator or on the basis of predefined parameters, and the creation of an analysis window, initially centered on the initial point, the dimensions of which are determined by the operator or on the basis of predefined parameters.

Preferably also, the set of the points of passage of axes of the herringbone patterns form a deformed grid which is used to reposition and/or deform the pieces to be cut.

In this case, the step of determining the coordinates of points of passage of axes of the herringbone patterns advantageously comprises iteratively moving the analysis window within the image along each of the lines of operation.

Still in this case, the step of determining the coordinates of points of passage of axes of the herringbone patterns preferably comprises calculating correlation coefficients between the two mirror sub-images inscribed in the analysis window.

The step of determining the coordinates of points of passage of axes of the herringbone patterns can further comprise the recording of the coordinates of the geometric center of the analysis window when the correlation coefficient is maximized in absolute value.

The analysis window can have a width corresponding to about 40% of the distance between two adjacent herringbone pattern axes.

The step of determining the coordinates of points of passage of axes of the herringbone patterns can comprise the calculation of the coordinates of the theoretical points of passage along lines of operation.

Preferably, in the case of vertical herringbone patterns, the lines of operation are horizontal, and in the case of horizontal herringbone patterns, the lines of operation are vertical.

The invention also relates to a system for automatically detecting characteristic points of a herringbone fabric with a view to automatically cutting pieces, the herringbone patterns being formed by V-shaped features with vertices that are aligned along a plurality of parallel axes, the system comprising:
  means for acquiring an image of a segment of the fabric;
  detection initialization means comprising, on the basis of predefined parameters or on the basis of the image, acquiring geometric parameters of the herringbone patterns and defining lines of operation perpendicular to the axes of the herringbone patterns; and
  means for determining in the image the coordinates of points of passage of axes of the herringbone patterns along lines of operation by the optimization of a criterion of symmetry of two mirror sub-images acquired along lines of operation.

BRIEF DESCRIPTION OF THE DRAWINGS

FIGS. 4A and 4B show examples of determination for the implementation of the method of the invention.

DESCRIPTION OF EMBODIMENTS

Figures 1A, 1B:
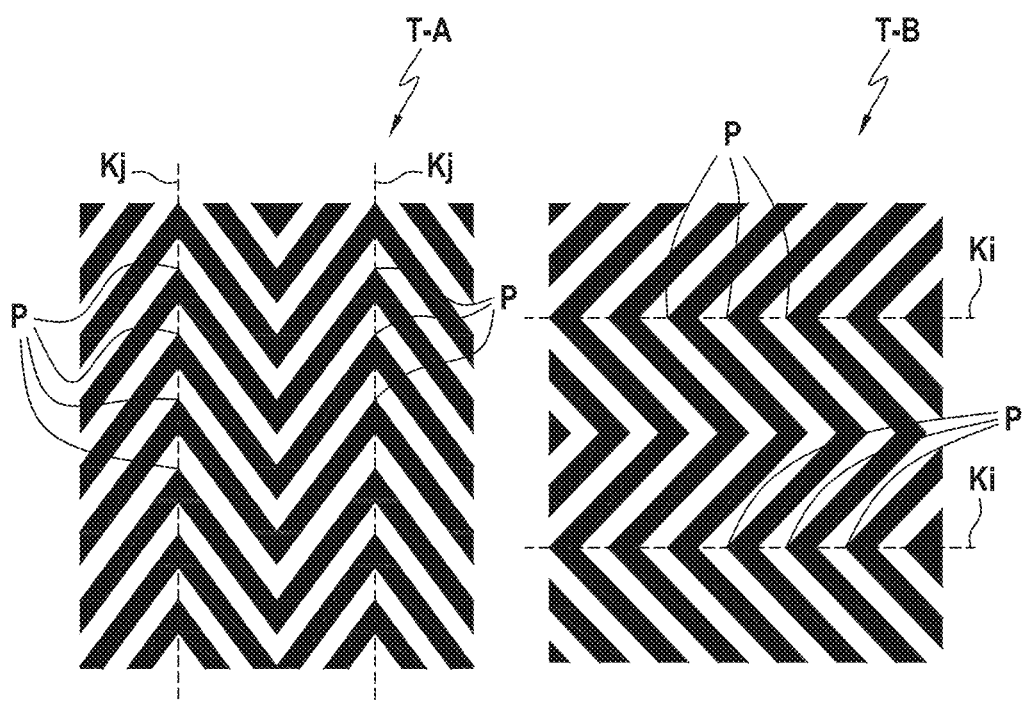
FIGS. 1A and 1B show examples of herringbone fabrics to which the invention applies.

The invention relates to the automatic detection of characteristic points of a zigzag or sawtooth herringbone fabric, such as the fabrics T-A and T-B shown in FIGS. 1A and 1B.

In a known manner, herringbone fabrics are weaves used in weaving and obtained by reproducing, after inversion, weaves in twill or twill derivatives.

More specifically, the herringbone patterns of these fabrics T-A, T-B are formed by V-shaped features with vertices P that are aligned along a plurality of parallel axes. In the case of vertical herringbone patterns (FIG. 1A), the axes $K_j$ of the herringbone patterns passing through the vertices P of the herringbone patterns are vertical axes. In the case of horizontal herringbone patterns (FIG. 1B), the axes $K_i$ of the herringbone patterns passing through the vertices P of the herringbone patterns are horizontal axes.

In the example of FIGS. 1A and 1B, the herringbone patterns thus form a succession of parallel strips of different colors and of the same widths which are symmetrical with respect to the axes Kj, Ki of the herringbone patterns, respectively. Of course, the invention applies to other shapes of V-shaped features, in particular with irregular patterns and/or inverse symmetry as detailed later in connection with FIGS. 5A to 5D.

The method according to the invention aims at recognizing the presence of herringbone patterns in the image of a segment of a herringbone fabric (as described in connection with FIGS. 1A and 1B) spread on a cutting table.

Figure 2:
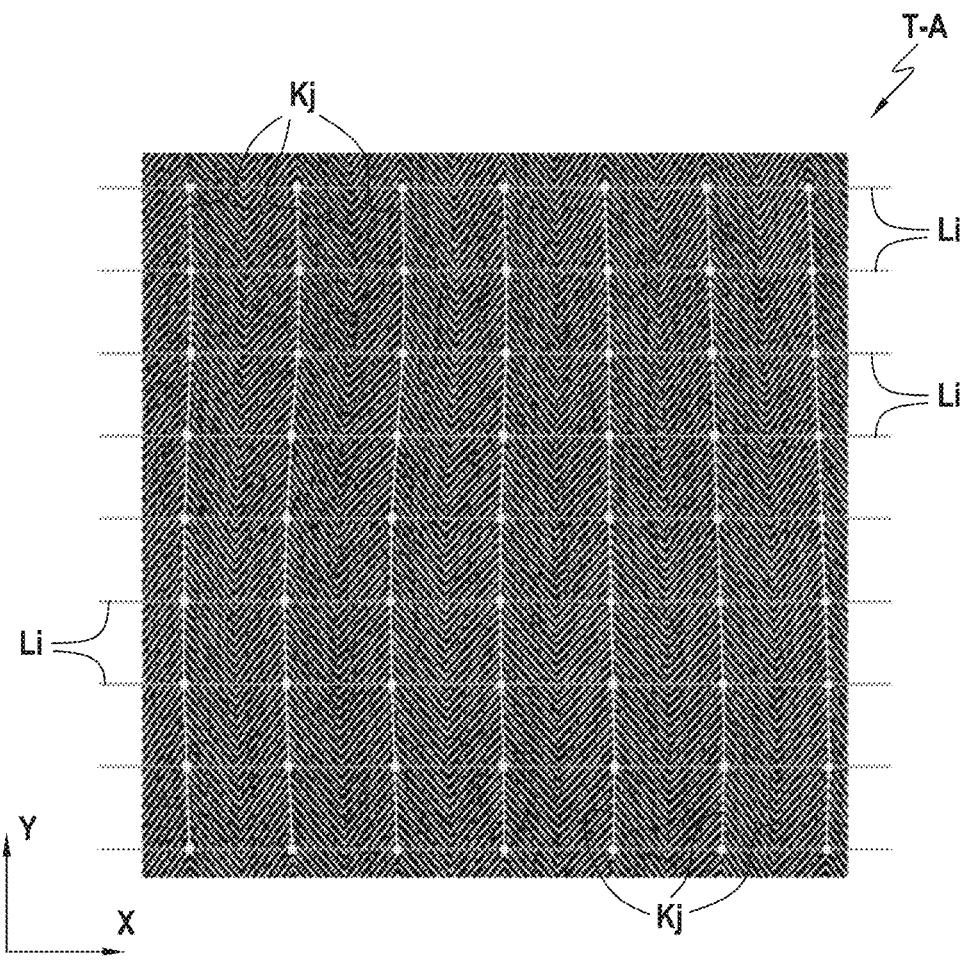
FIG. 2 shows an example of an image of a segment of herringbone fabric after application of the method according to the invention.

In particular, as shown in FIG. 2, the method according to the invention aims at determining the position of the intersections of the axes Kj (which are here vertical) of alignment of the vertices of the V-shaped features of the fabric with a plurality of predefined lines of operation Li.

The lines of operation are lines that are predefined by the operator to be perpendicular to the herringbone pattern axes, parallel to each other, and spaced (preferably with a regular pitch) from each other.

Thus, in the case of FIG. 2 which shows a fabric with vertical herringbone patterns, the axes Kj of these herringbone patterns are substantially vertical lines and the lines of operation Li are horizontal lines.

Of course, in the case of detection of horizontal herringbone patterns, the axes of the latter are horizontal lines, and the lines of operation are defined to be vertical lines.

This recognition operation according to the invention allows to model a grid reflecting distortions mainly due to the imperfect unwinding of the width of fabric on the cutting table, this deformed grid being used to reposition and/or deform the pieces to be cut.

To this end, the method according to the invention provides for the following successive main steps:

1/A step of acquiring an image of a segment of the fabric:

This step is carried out in a manner known per se by spreading the fabric on the cutting table to take an image of a segment thereof by means of an image sensor.

2/A detection initialization step:

This step consists in acquiring, on the basis of the image acquired previously or on the basis of parameters predefined by the operator, the geometric parameters of the herringbone patterns, as well as defining the lines of operation. This step is carried out by the operator using a calculator onboard the cutting machine or separate therefrom. The parameters can be determined at the last moment on the cutting machine or be defined beforehand.

3/A step of determining the points of passage of the axes of the herringbone patterns along lines of operation:

This step consists of an automatic algorithm for optimizing a criterion of symmetry of two mirror sub-images acquired along lines of operation. It is for example carried out at the calculator used during the previous step. It allows to obtain the coordinates of the vertices of the herringbone patterns in the fabric which constitute characteristic points of the patterned fabric.

Figure 3:
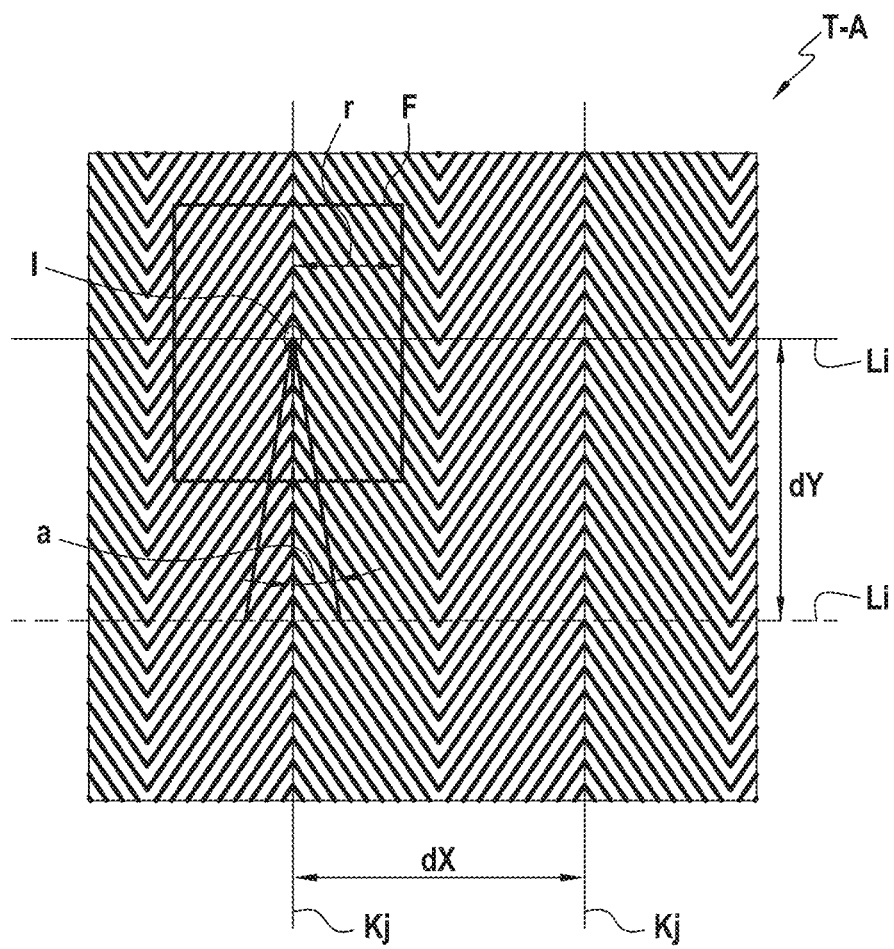
FIG. 3 shows an example of initialization of the detection for the implementation of the method of the invention.
Figures 5A, 5B:
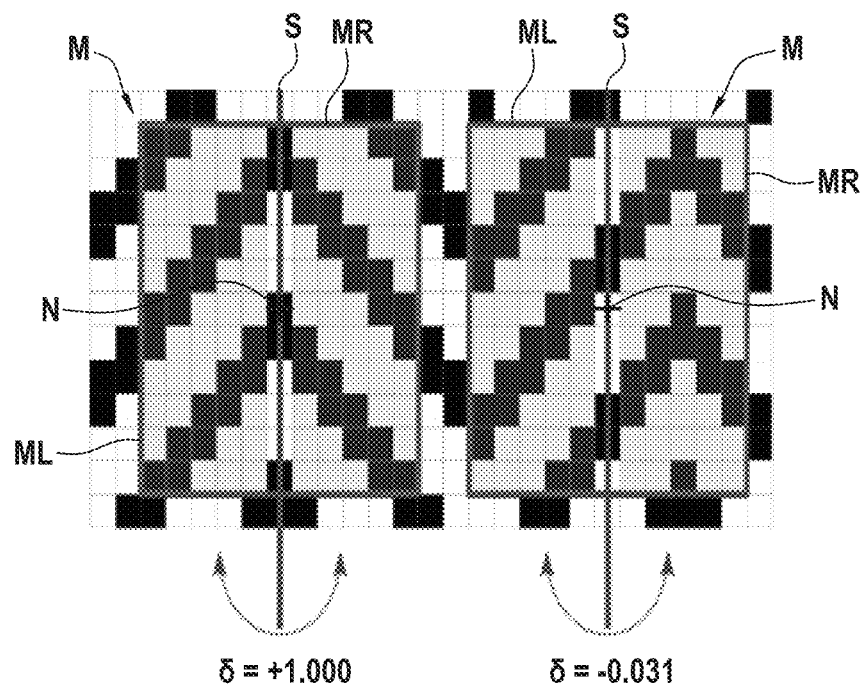
FIGS. 5A to 5D show different examples of implementation of the step of optimizing a criterion of symmetry.
Figures 5C, 5D:
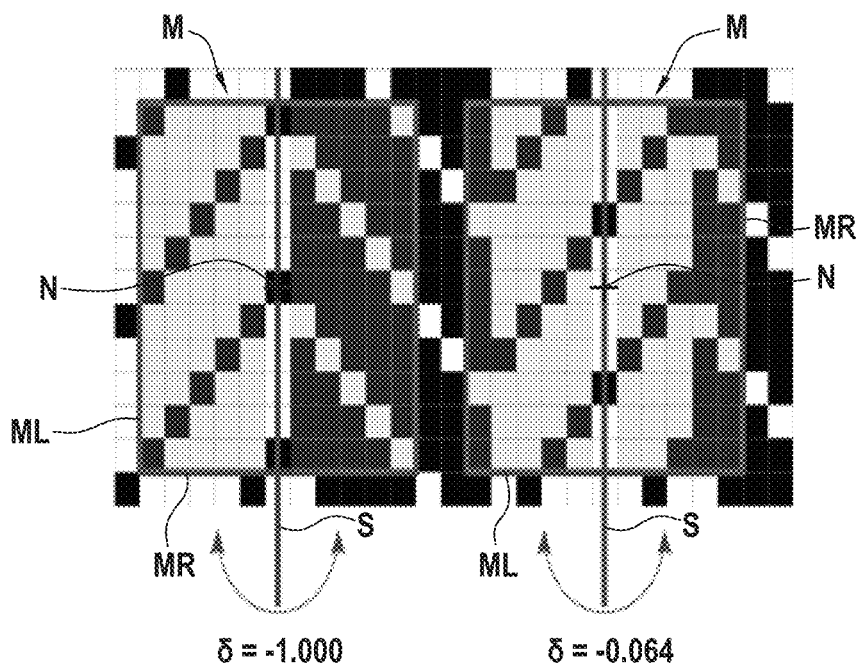

In connection with FIG. 3, an example of implementation of the detection initialization step according to the method of the invention will now be described.

This step consists for the operator in defining a certain number of parameters relating to the herringbone patterns of the fabric, namely:

the direction of the herringbone patterns which can be vertical (case of FIG. 1A) or horizontal (case of FIG. 1B);

an initial point I with coordinates (xI, yI) corresponding to the first theoretical point of passage on the first line of operation that the operator will locate approximately on the image (the position of the exact point of passage will be determined by a research algorithm described later);

the horizontal pitch dX corresponding, in the case of vertical herringbone patterns to the theoretical horizontal spacing between two herringbone pattern axes Kj, and in the case of horizontal herringbone patterns, to the distance between two vertical lines of operation Lj;

the vertical pitch dY corresponding, in the case of horizontal herringbone patterns to the theoretical vertical spacing between two herringbone pattern axes Ki, and in the case of vertical herringbone patterns, to the distance between two horizontal lines of operation Li;

the maximum angle a of inclination of the herringbone patterns corresponding to the maximum angle deviation authorized with respect to the vertical for vertical herringbone patterns (respectively to the horizontal for horizontal herringbone patterns);

the width r of an analysis window F of the image: this value, which depends on the noise level of the acquired image, may be of the order of 40% of the distance between two adjacent herringbone pattern axes but can be reduced to improve calculation times for low noise images.

This initialization step may advantageously include the verification of a coherent detection of the vertical herringbone (respectively horizontal) patterns by ensuring that the vertical pitch dX (respectively the horizontal pitch dY) verifies the following relationship: (dY×tan(a)+r) is strictly less than dX/2 for vertical herringbone patterns, and (dX×tan(a)+r) is strictly less than dY/2 for horizontal herringbone patterns.

In connection with FIGS. 4A and 4B, an example of an algorithm for implementing the step of determining the points of passage will now be described in accordance with the method according to the invention for vertical herringbone patterns (FIG. 4A) and for horizontal herringbone patterns (FIG. 4B).

For the vertical herringbone patterns (FIG. 4A), the lines of operation Li are horizontal lines of regular spacing dY and numbered for example from top to bottom of the image, the first line of operation L0 (i=0) being selected to pass through the initial point I previously defined and with coordinates (xI, yI).

The axes Kj of the herringbone patterns are lines with a vertical tendency which are numbered, for example from left to right of the image, the first axis of the herringbone patterns being numbered K0 (j=0). The theoretical points of passage N of the j-th herringbone pattern axis with the i-th line of operation are the points of coordinates xA(i,j), yA(i,j) with i varying from 0 to the number of lines of operation.

Similarly, for the horizontal herringbone patterns (FIG. 4B), the lines of operation Lj are vertical lines of regular spacing dX and numbered for example from left to right of the image, the first line of operation L0 (j=0) being selected to pass through the initial point I previously defined and with coordinates (xI, yI).

The axes Ki of the herringbone patterns are lines with a horizontal tendency which are numbered, for example from top to bottom of the image, the first axis of the herringbone patterns being numbered K0 (i=0). The theoretical points of passage N' of the i-th herringbone pattern axis with the j-th line of operation are the points of coordinates xA(i,j), yA(i,j) with j varying from 0 to the number of lines of operation.

The determination step of the method according to the invention consists in iteratively moving the analysis window F defined beforehand along the various lines of operation Li, Lj within the image starting from the initial predefined point I.

The analysis window is moved at each iteration by a distance corresponding to the vertical pitch dX (for the vertical herringbone patterns) and the horizontal pitch dY (for the horizontal herringbone patterns).

During the movement of the analysis window, the algorithm calculates the coordinates of the points of passage xA(i,j), yA(i,j) of axes of the herringbone patterns with the lines of operation.

To this end, at each iteration, the algorithm calculates a correlation coefficient between two mirror sub-images inscribed in the analysis window F. When the correlation coefficient thus calculated is maximized in absolute value, the coordinates of the geometric center of the analysis window F correspond to those of the theoretical point of passage N of the corresponding herringbone pattern axis with the corresponding line of operation.

In a scanned image, the probability of a vertical herringbone pattern axis passing through a point of passage will be even greater if the segments of the image located on either side of the vertical passing through this point are symmetrical relative to each other (within luminance inversion).

As shown in FIGS. 5A to 5D, to calculate this probability, the algorithm considers, from the square sub-image M inscribed in the analysis window and centered on a theoretical point of passage xA, the two sub-images on the left ML and on the right MR of the axis of symmetry S passing through the theoretical point of passage N.

The algorithm then calculates the correlation coefficient $\underline{\delta}$ between the sub-image ML and the sub-image MR (mirror of ML). The calculation of this correlation coefficient $\underline{\delta}$ is performed from tables containing the series of luminance t1, t2 of the two sub-images ML, MR, respectively, and its result is typically given by the following mathematical formula: $\delta = Cov(t1, t2)/e1 \times e2$; where "Cov" denotes the covariance between series t1 and t2, and e1 and e2 denote the standard deviation of series t1 and t2, respectively.

The interpretation of the result obtained is as follows:

1/When the result obtained is equal to or close to +1 (case of FIG. 5A): this is a symmetry between the two sub-images ML and MR with respect to the axis S. This result therefore indicates the presence of herringbone patterns and the axis of symmetry S is considered as a herringbone pattern axis Ki. The coordinates of the geometric center of the analysis window are stored.

2/When the result obtained is equal to or close to 0 (positively or negatively—case of FIGS. 5B and 5D): there is an asymmetry between the two sub-images ML and MR with respect to the axis S. This result indicates that the axis of symmetry S is not a herringbone pattern axis.

3/When the result obtained is equal to or close to −1 (case of FIG. 5C): it is a symmetry with luminance inversion (that is to say a light pixel corresponds to a dark pixel and vice versa) between the two sub-images ML and MR with respect to the axis of symmetry S. This result therefore indicates the presence of herringbone patterns with a luminance inversion and the axis of symmetry S is considered as a herringbone pattern axis Ki. The coordinates of the geometric center of the analysis window are stored.

Thus, the presence of herringbone patterns will be confirmed for a correlation coefficient close to 1 in absolute value. In this situation, the coordinates of the geometric center of the analysis window will be systematically stored because they correspond to the position of the herringbone pattern vertices on the fabric.

Note that the analysis window can be moved along a line of operation from pixel to pixel. In this case, for each pixel, the algorithm calculates the correlation coefficient of the two sub-images on either side of the axis of symmetry, which gives a plot of the correlation coefficient as a function of the position along the line of operation. This curve shows local maximums whenever the analysis window is centered on a herringbone pattern axis. The coordinates of the geometric center of the analysis window when these maximums are reached are systematically stored.

It will also be noted that the set of points of passage N, N' of the axes of the herringbone patterns form a grid as shown in FIG. 2 which is deformed with respect to a theoretical grid which would have been drawn up from a regular pitch between the vertices of the herringbone patterns and a regular alignment of the vertices of the herringbone patterns along parallel straight lines. This deformed grid is thus used to reposition and/or deform the pieces to be cut.

The invention claimed is:

1. A method for automatically detecting characteristic points of a herringbone fabric with a view to automatically cutting pieces, the herringbone patterns being formed by V-shaped features with vertices that are aligned along a plurality of parallel axes, the method comprising:
   a step of acquiring an image of a segment of the fabric;
   a detection initialization step comprising:
      based on predefined parameters, acquiring geometric parameters of the herringbone patterns including vertical or horizontal direction of the herringbones, an initial point of coordinates corresponding to a first theoretical point of passage on a first line of operation, and a theoretical spacing between two herringbone pattern axes;
      based on the initial point, defining lines of operation perpendicular to the axes of the herringbone patterns and spaced from each other by an operator-defined pitch or predefined parameters; and
      creating an analysis window, initially centered on the initial point, having dimensions determined by the operator or on the basis of predefined parameters;
   a step of determining, in the image, coordinates of points of passage of axes of the herringbone patterns along the lines of operation by iteratively moving the analysis window within the image along each of the lines of operation and optimizing a criterion of symmetry of two mirror sub-images acquired along lines of operation;
   wherein the points of passage of axes of the herringbone patterns form a deformed grid which is used to reposition and/or deform the pieces to be cut.

2. The method according to claim 1, wherein the step of determining the coordinates of points of passage of axes of the herringbone patterns comprises calculating correlation coefficients between the two mirror sub-images inscribed in the analysis window.

3. The method according to claim 2, wherein the step of determining the coordinates of points of passage of axes of the herringbone patterns further comprises the recording of the coordinates of the geometric center of the analysis window when the correlation coefficient is maximized in absolute value.

4. The method according to claim 1, wherein the analysis window has a width corresponding to less than or equal to 40% of the distance between two adjacent herringbone pattern axes.

5. The method according to claim 1, wherein the step of determining the coordinates of points of passage of axes of the herringbone patterns comprises the calculation of the coordinates of the theoretical points of passage along lines of operation.

6. The method according to claim 1, wherein in the case of vertical herringbone patterns, the lines of operation are horizontal, and in the case of horizontal herringbone patterns, the lines of operation are vertical.

7. A system for automatically detecting characteristic points of a herringbone fabric with a view to automatically cutting pieces, the herringbone patterns being formed by V-shaped features with vertices that are aligned along a plurality of parallel axes, the system comprising:

means for acquiring an image of a segment of the fabric;
detection initialization means configured to:
based on predefined parameters, acquire geometric parameters of the herringbone patterns including vertical or horizontal direction of the herringbones, an initial point of coordinates corresponding to a first theoretical point of passage on a first line of operation, and a theoretical spacing between two herringbone pattern axes;
based on the initial point, define lines of operation perpendicular to the axes of the herringbone patterns and spaced from each other by an operator-defined pitch or predefined parameters; and
create an analysis window, initially centered on the initial point, having dimensions determined by the operator or based on predefined parameters;

means for determining in the image the coordinates of points of passage of axes of the herringbone patterns along the lines of operation by iteratively moving the analysis window within the image along each of the lines of operation and optimizing a criterion of symmetry of two mirror sub-images acquired along lines of operation;

wherein the points of passage of axes of the herringbone patterns form a deformed grid which is used to reposition and/or deform the pieces to be cut.

* * * * *